United States Patent [19]

Lonsinger, Jr.

[11] 4,306,600
[45] Dec. 22, 1981

[54] PROTECTIVE COVER FOR ROTARY LAWN MOWER BLADE

[76] Inventor: Charles D. Lonsinger, Jr., 1467 Ship Rd., West Chester, Pa. 19380

[21] Appl. No.: 125,753

[22] Filed: Feb. 29, 1980

[51] Int. Cl.³ .............................................. B26D 7/22
[52] U.S. Cl. .................................... 150/52 R; 30/151
[58] Field of Search ................ 150/52 R; 206/349; 30/151, 152, 164, 286, 287

[56] References Cited

U.S. PATENT DOCUMENTS

| | | | |
|---|---|---|---|
| 290,205 | 12/1883 | Bronson | 150/52 R |
| 1,082,862 | 12/1913 | Geschickter | 150/52 R X |
| 1,934,115 | 11/1933 | Burns | 150/52 R X |
| 2,792,163 | 5/1957 | Kidwell | 150/52 R |
| 2,901,823 | 9/1959 | Widen | 30/151 |
| 2,904,128 | 9/1959 | Boham | 150/52 R X |
| 3,042,087 | 7/1962 | Otoupalik | 30/151 |
| 3,239,114 | 3/1966 | Norsworthy | 150/52 R |

Primary Examiner—Donald F. Norton
Attorney, Agent, or Firm—Robert S. Lipton

[57] ABSTRACT

A protective device for sharpened cutting edges is disclosed. A sheath apparatus adapted to be connected, and secured, to the opposite ends of a blade for a rotary lawn mower is described. The invention provides protection for the user thereof when attaching or detaching rotary lawn mower blades or during the sharpening of such blades.

1 Claim, 2 Drawing Figures

PROTECTIVE COVER FOR ROTARY LAWN MOWER BLADE

BACKGROUND OF THE INVENTION

This invention generally relates to devices for protecting the integrity of a sharpened cutting edge on a tool and for protecting the operator as user of the tool. In particular the invention relates to a protective device for sharp blades such as those used in rotating machinery used for shearing.

In machinery using rotating cutting blades in which one edge is a sharpened edge it is frequently necessary to work near the cutting edge of such a blade. In some circumstances it is necessary to restrain the blade from rotating while removing it from or attaching it to the machinery. While performing sharpening operations it is also necessary to restrain the blade from rotating without removing the blade.

In handling such cutting edges, in particular in devices such as rotary lawn mowers, it is necessary to block the blade from rotation by inserting physical restraints such as wood blocks or metal bars between the blade and the housing in which it rotates. This procedure has the disadvantage of possibly dulling the blade by forcing it against a hard surface such as a steel bar and increases the risk of injury to the operator which is always present when dealing with an exposed sharpened edge. This is particularly true when removing or installing blades in rotary machines or where it is necessary to remove restraining devices in order to remove the blade from the machine.

The present invention overcomes these disadvantages by providing a portable, removable protective cover for the cutting edge of the blade. In addition, where the blade is a double edge blade having cutting edges on opposite ends of a rotating arm there is provided a separate covering for each of the cutting edges and a means for connecting the coverings to insure their retention on the cutting edge.

SUMMARY OF THE INVENTION

The protective device of the instant invention provides a sheath-like device of a tough material which can be placed over the cutting edges of the blade to protect the blade from damage and to protect the operator from being injured by the cutting surface.

There is further provided a means for protecting opposite ends of a rotating blade with separate sheath-like devices which are connected by a removable coupling which maintains the devices in a proper relationship and secures them to the blade surface.

DESCRIPTION OF THE PREFERRED EMBODIMENT

Figure 1:
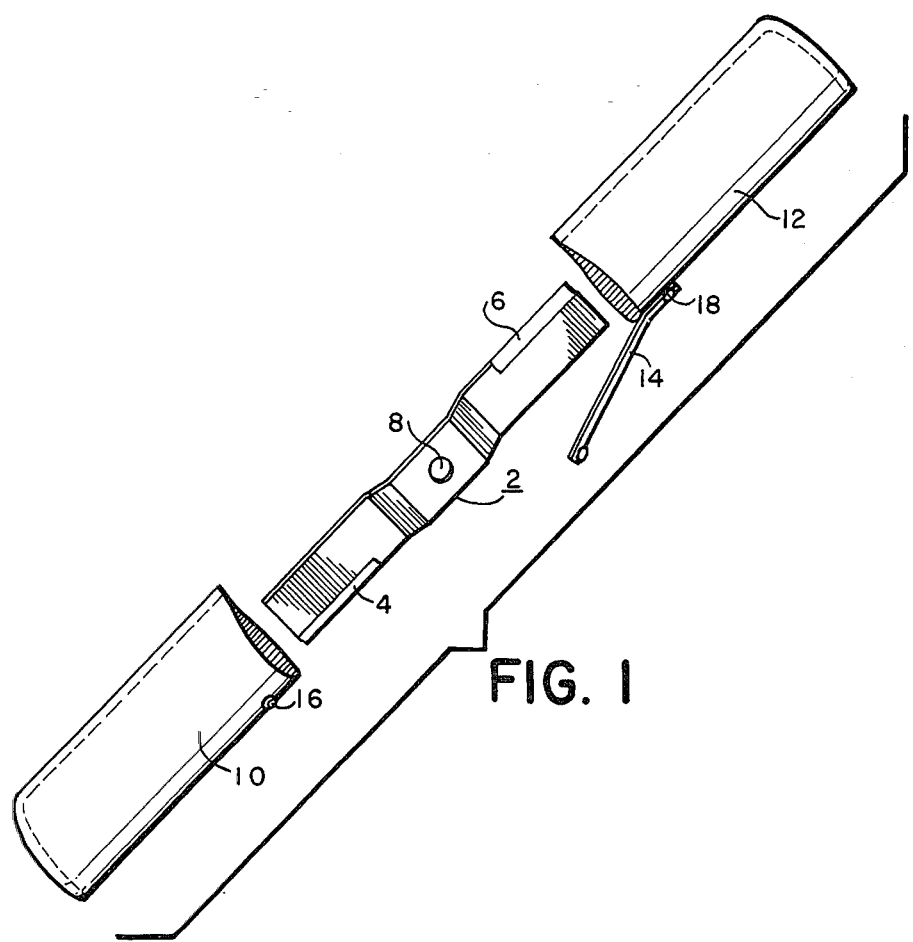
FIG. 1 is a persepective view of the protective device of the invention

Referring now to FIG. 1 there is shown at 2 a blade suitable for attachment to a rotary cutting machine such as a rotary lawn mower. The blade is provided with opposite cutting surfaces 4 and 6 on opposite ends of the blade. There is provided a central opening 8 by which the blades attach to a shaft (not shown) which is rotated by the rotary power source of the mower.

The protective device is shown generally as a pair of sheath-like portions 10 and 12 each of which is sized to cover the respective blade portions 4 and 6. The two sheath portions are further provided with attachment means, such as snaps 16 and 18, for example, as shown in FIG. 1. The mating parts of snaps 16 and 18 are attached to a strap member 14 by which the two sheath portions may be connected and restrained on the blade.

Figure 2:
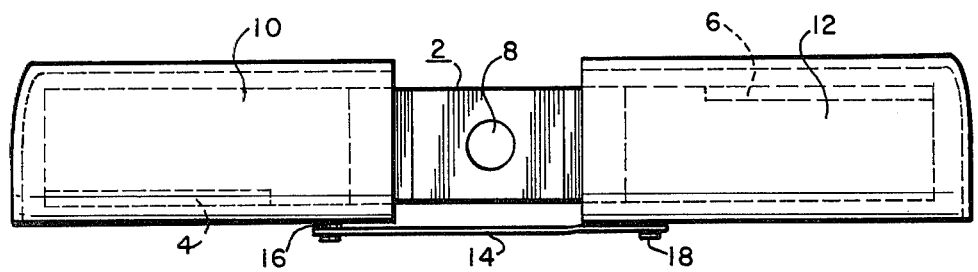
FIG. 2 is a plan view of the protective device installed on the cutting surface.

Referring now to FIG. 2 there is shown the protective device of the invention completely installed over the cutting blade as described above. The two sheath portions of the invention 10 and 12 have been placed over the cutting edges 4 and 6 respectively. The two sheaths are then connected by means of strap 14 which is attached to snaps 16 and 18, securing the two sheath halves over the blade.

With the protective device installed as shown in FIG. 2 it may be seen that the cutting edges 4 and 6 of the blade 2 are fully protected from damage by restraining or blocking devices which may be required for removing or installing a blade, and further, that the operator is protected from injury from the sharpened edges by means of these devices. The sheath portions 10 and 12 may be of any strong and tough material, such as leather, reinforced plastics, or other suitable material.

While specific embodiments of the invention have been illustrated and described, it is to be understood that these embodiments are provided by way of example only and that the invention is not to be construed as being limited thereto but only by the proper scope of the following claims.

What is claimed is:

1. A protective device, for a rotary lawn mower blade of the type having a metal cutting member secured to the lawn mower at its midpoint and having a pair of cutting edges disposed on opposite sides of said midpoint and terminating at the opposite ends of the blade, which comprises: a pair of identical and substantially flat sheath members open at one end thereof, each of said sheath members being constructed of a piece of leather folded over upon itself and stitched along one end and side thereof to form said open ended sheath, each of said sheath members being substantially identical and adapted to slip over and encompass one end of the blade so as to cover the cutting edge thereof, but not to cover the midpoint thereof; a leather strap; and snap connection means connected to each of said pair of sheaths and to said leather strap so as to enable said strap to easily be snapably engaged and disengaged from said pair of sheath members whereby the blade may be covered by and have secured thereto said pair of sheath members so as to protect a person from receiving an injury from the cutting member when removing the blade from the lawn mower.

* * * * *